United States Patent [19]
Scarton et al.

[11] 4,332,300
[45] Jun. 1, 1982

[54] PNEUMATIC HAMMER NOZZLE SEAL

[75] Inventors: Henry A. Scarton, Troy, N.Y.; Warren C. Kennedy, Pittsburgh, Pa.

[73] Assignee: Rensselear Polytechnic Institute, Troy, N.Y.

[21] Appl. No.: 48,392

[22] Filed: Jun. 14, 1979

[51] Int. Cl.³ ........................ B25D 17/08; B23B 31/20
[52] U.S. Cl. ........................................ 173/104; 173/139; 279/19.7; 277/188 R
[58] Field of Search ............... 173/139, 116, 132, 104, 173/163; 279/20, 19.6, 19.7; 277/188 R

[56] References Cited

U.S. PATENT DOCUMENTS

| | | | |
|---|---|---|---|
| 1,792,893 | 2/1931 | Collins | 173/139 X |
| 3,752,241 | 8/1973 | Bent | 173/163 |
| 3,905,609 | 9/1975 | Sussman | 279/20 |
| 4,189,162 | 2/1980 | Rasmussen et al. | 279/20 X |

*Primary Examiner*—Werner H. Schroeder
*Assistant Examiner*—Andrew M. Falik
*Attorney, Agent, or Firm*—McGlew and Tuttle

[57] ABSTRACT

A nozzle seal for restricting pneumatic leakage from the nozzle hole of a pneumatic hammer having a tool shank movable therein, comprising, a bushing member and a retaining member axially aligned in the nozzle hole of the pneumatic hammer with a seal member therebetween. Bores are provided through the bushing member, retainer member and seal member for accepting the tool shank with the seal member having a bore closely fit around the tool shank to prevent a leakage of air from the interior of the hammer through the nozzle hole. The bushing member is press-fit and firmly held in the nozzle hole while the retainer member is slip-fit into the hole to facilitate its removal and access to the seal member. The bores may be polygonal, circular or oval to accept tool shanks of corresponding cross-sectional shapes. An O-ring may be provided on the retainer member for establishing a hermetic seal between the retainer member and the nozzle housing and a pin may be provided on the retainer member extending through an aperture in the seal member to establish a proper orientation between the bores of the retainer and bushing members and the bore of the seal member.

14 Claims, 4 Drawing Figures

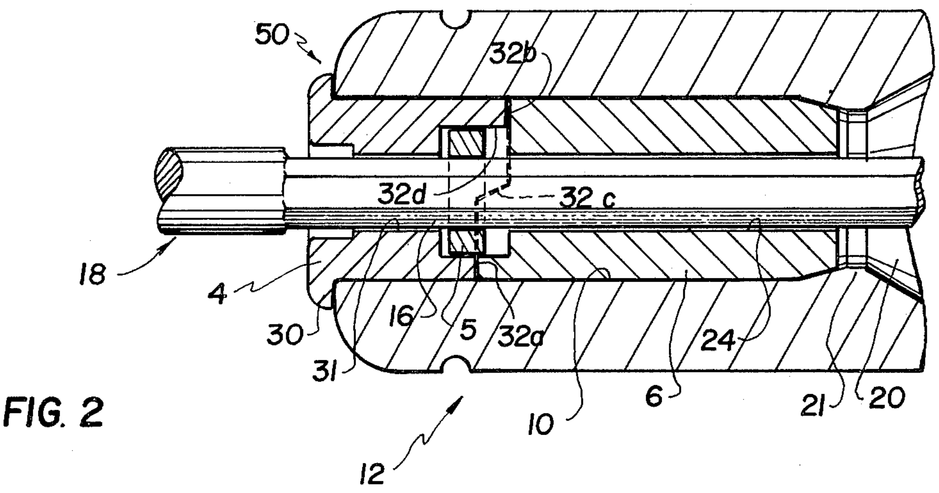
FIG. 2
FIG. 4
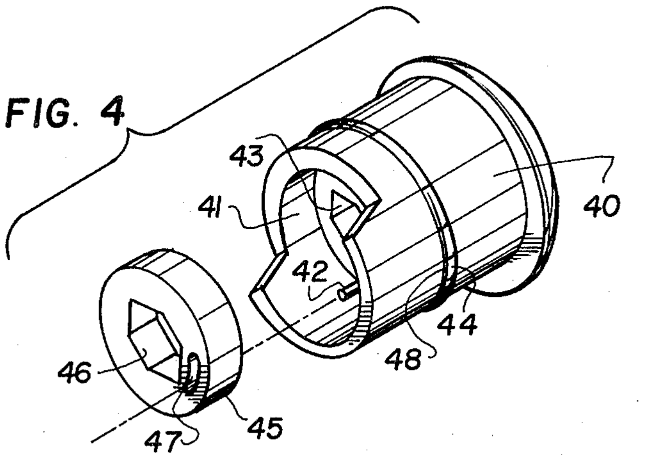

PNEUMATIC HAMMER NOZZLE SEAL

FIELD AND BACKGROUND OF THE INVENTION

The present invention relates to improvements in jack hammers and rotary hammers in general and, in particular, to a new and useful air seal which is provided between the nozzle hole of a pneumatic hammer and a tool shank which is movable therein for restricting or preventing a leakage of air or pneumatic fluid from the interior of the hammer through the nozzle hole.

DESCRIPTION OF THE PRIOR ART

A wide variety of pneumatic hammers, such as jack hammers and rotary hammers are known which incorporate a single sealing element between the nozzle hole of the hammer and a movable tool shank which reciprocates and may rotate within the nozzle hole. Little or no provision is made for restricting the leakage of air from the interior of the jack hammer through the nozzle hole. It has been found that a major source of noise produced by these pneumatic percussion tools is the discharge of air from the tool. This discharge of air is primarily through the exhaust ports of the device, but significant amounts of air also leave in the clearance space between a tool shank, such as a chisel, and the housing or nozzle hole in which the tool shank moves.

The noise levels produced by these pneumatic percussion tools are exceptionally high and contribute to hearing impairment as well as other physiological damage. A further harmful effect caused by these pneumatic percussion tools is due to the excessive vibration and cold air discharged from the devices. The air is exceptionally cold since it is discharged under pressure and the sudden reduction in pressure causes a corresponding reduction in temperature. It has been found that workers utilizing vibrating objects, such as vibrating tools, or the like, experience the transmission of the vibration in the tool to their upper extremities. This transmission of vibration has been found to attack three systems of the human organism. These systems are the vascular system, the musculoskeletal system and the peripheral nervous system. Corresponding disorders which have been found are Raynaud's phenomena, angiospasm and vasoneurosis, respectively. For treatment of the connection between vasoneurosis and vibrating tools, see the paper written by D. E. Wasserman and W. Taylor in "Proceedings of the International Occupational Hand-Arm Vibration Conference", National Institute for Occupational Safety and Health, Cincinnati, Ohio, U.S.A., Oct. 1975, at page 253.

Since substantial amounts of air or other pneumatic fluid which is used in these percussion devices is emitted from around the moving tool shank, a reduction of such air flow will reduce the injurious effects of the cold air or pneumatic material which contributes to the injury caused by vibration and will reduce the noise level of the pneumatic device in operation.

SUMMARY OF THE INVENTION

The present invention relates to a pneumatic hammer nozzle seal for reducing or totally eliminating the high pressure air discharged from the hammer between a nozzle hole thereof and a tool shank. The inventive seal may be utilized in the nozzle hole of a rotary hammer, a jack hammer or any other pneumatic percussion tool which includes a nozzle hole having a tool shank movable therein. The tool may be a chisel or rotary hammer drill of any cross-sectional shape which is utilized in such pneumatic percussion devices.

The invention primarily comprises a bushing or bushing member which is fixedly retained within the base of a nozzle hole, a slip-fit seal retainer inserted into the nozzle hole over the bushing member and a seal ring disposed between the seal retainer and the bushing member. Each of the members includes an aligned bore therethrough for receiving the tool shank with the bore of the seal ring being of a size to closely engage around the tool shank. The mating surfaces of the seal retainer and bushing may comprise corresponding transverse parallel and offset surfaces which mate with each other to prevent rotation of the seal retainer with respect to the fixed bushing. This construction is especially important in preventing the rotation of a chisel shank which is not meant to rotate in its normal operation. Alternatively, the mating surfaces may be planar to permit a relative rotation when the tool shank is that of a rotary hammer tool which does rotate in its normal use.

Accordingly, an object of the present invention is to provide a nozzle seal for restricting pneumatic leakage from the nozzle hole of a pneumatic hammer having a tool shank movable therein comprising, a bushing member having a first bore therethrough adapted to be press-fit into the nozzle hole, the bushing member having a first mating surface adjacent one end of said bore, a retainer member having a second bore therethrough aligned with said first bore and adapted to be slip-fit into the nozzle hole, the retaining member having a second mating surface mating with said first mating surface and a recess adjacent said second mating surface, and a seal member having a third bore therethrough aligned with said first and second bores and disposed in said recess of said retaining member, said third bore having a size to closely receive the tool shank.

A further object of the present invention is to provide a pneumatic hammer nozzle seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a longitudinal cross-sectional view of the assembled device of the embodiment shown in FIG. 1;

FIG. 4 is a rear exploded perspective view of the seal ring and seal retainer of another embodiment of the invention.

DESCRIPTION OF THE PREFERRED EMBODIMENTS

Figure 1:
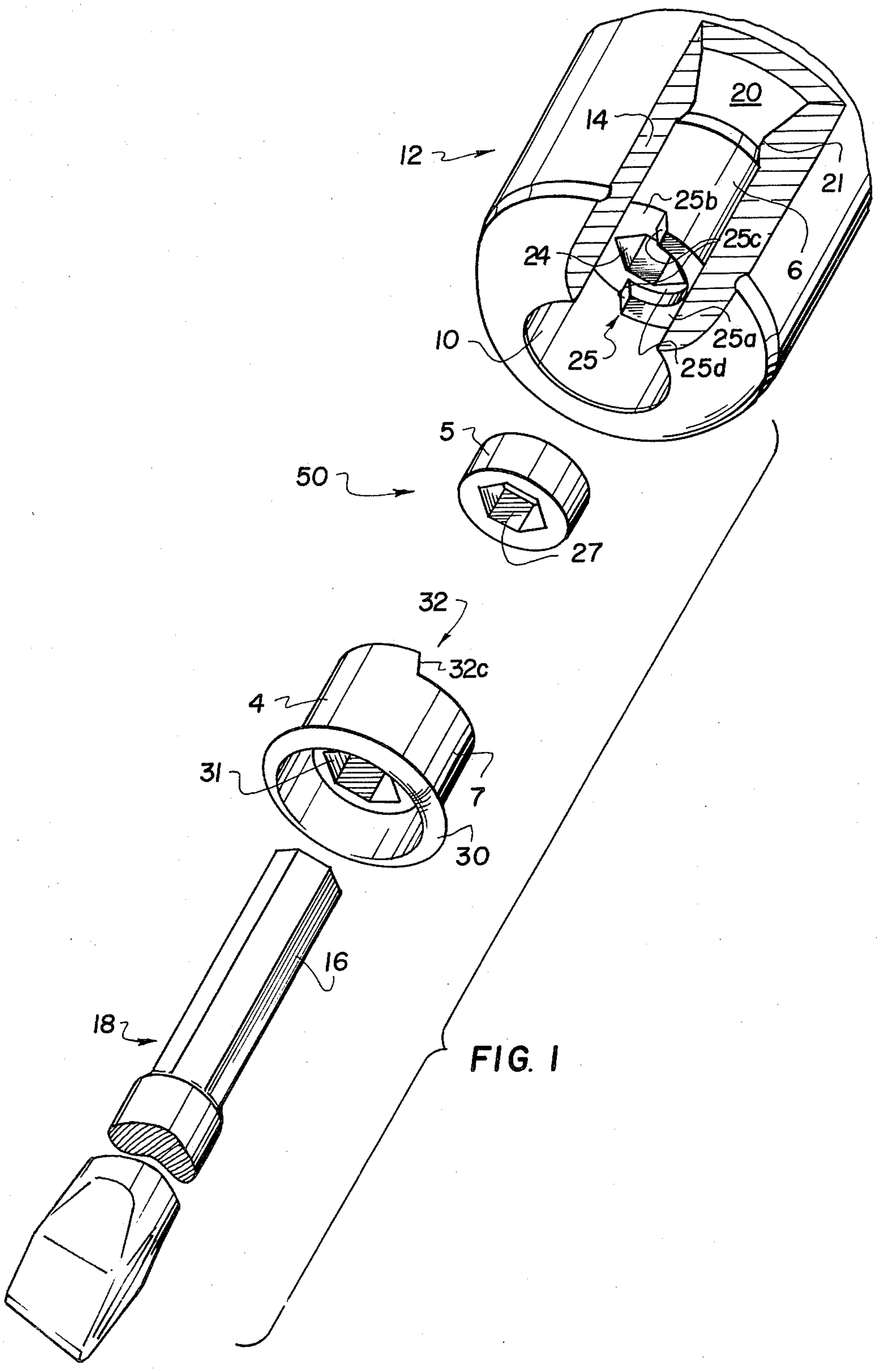
FIG. 1 is a front exploded perspective view of a seal for the nozzle hole of a pneumatic hammer constructed in accordance with the invention.

Referring to the drawings in particular, the invention embodied therein in FIGS. 1 and 2, comprises, a seal assembly, generally designated 50, for the nozzle hole 10 of a pneumatic hammer device, generally designated 12. Pneumatic hammer 12 may be a jack hammer, rotary hammer, or the like. Seal 50 is provided within nozzle hole 10 and between the housing 14 of pneumatic hammer 12 and a tool shank 16. Tool shank 16 may be the shank of any tool, generally designated 18, such as a chisel shown in FIG. 1 or the rotary hammer drill shown in FIG. 3. The purpose of seal 50 is to restrict or to prevent the leakage of air from the interior 20 of the pneumatic hammer 12 from escaping through nozzle hole 10 and past the chisel shank 16.

Seal assembly 50 comprises a bushing or bushing member 6 made of any suitable material, such as hardened steel, other metal or plastic. Bushing 6 is press- or force-fit into the nozzle hole 10 so as to be substantially fixed therein. A step 21 may be provided within the housing 14 to accurately position bushing 6. Bushing 6 includes a throughbore 24 which is of the same cross-sectional shape as chisel or tool shank 16. Bushing 6 includes a mating surface, generally designated 25, which, in the embodiment shown in FIG. 1, comprises two parallel transverse surfaces 25*a* and 25*b* which are connected by bevel surfaces 25*c*. A recess 25*d* is defined adjacent the mating surface 25. A seal ring or seal member 5 is inserted into the nozzle hole 10 and positioned within the recess 25*d* of bushing 6. Seal ring 5 includes a throughbore 27 which is of a shape and size corresponding to and capable of closely fitting around the shank 16. Bore 27 is preferably of a slightly smaller size than bore 24 to better establish an airtight engagement between the seal ring 5 and the tool shank 16. Seal ring 5 may be made of a material similar to that of bushing 6 or of a different material, depending on the durability demands of the pneumatic hammer 12.

Seal retainer 4 includes a main section 7 which is of a diameter sufficient to be slip-fit into the nozzle hole 10. The fit of seal retainer or retainer member 4 is snug within the nozzle hole 10, however, seal retainer 4 can be easily removed from the hole 10 to permit the replacement of seal ring 5 when it has worn.

Seal retainer 4 includes a flange portion 30 which is of an increased diameter to overlap the opening of nozzle hole 10 as best seen in FIG. 2. A bore 31 is included and passes through seal retainer 4. Bore 31 is of a size to permit the easy passing of chisel shank 16 and is aligned with the bores 27 and 24. Retainer member 4 includes a mating surface, generally designated 32, which complements the mating surface 25 of bushing 6. Mating surface 32, as shown in FIG. 2, includes transverse parallel surfaces 32*a* and 32*b* which are connected by bevel surfaces 32*c*.

A recess 32*d* is provided adjacent the mating surface 32 for accepting the seal ring 5 and is slightly larger than the seal ring or member 5. The mating of bevel surfaces 32*c* with bevel surfaces 25*c* provides a non-rotatable engagement between the retainer member 4 and the bushing member 6 which ensures the alignment of the first and second throughbores 24 and 31, respectively. Although the cross-sectional shape of the throughbores are all shown in FIG. 1 as being hexagonal for accepting a hexagonally cross-sectioned chisel shank 16, it should be understood that the shape may be square, polygonal or oval to correspond with a suitably shaped chisel shank 16. The term "bushing/retainer member" is meant in this specification to describe a structure having a recess therein, such as the recess 32*d* formed between the members 4 and 6, and which functions as the members 4 and 6 to constrain the seal ring or member 5.

Figure 3:
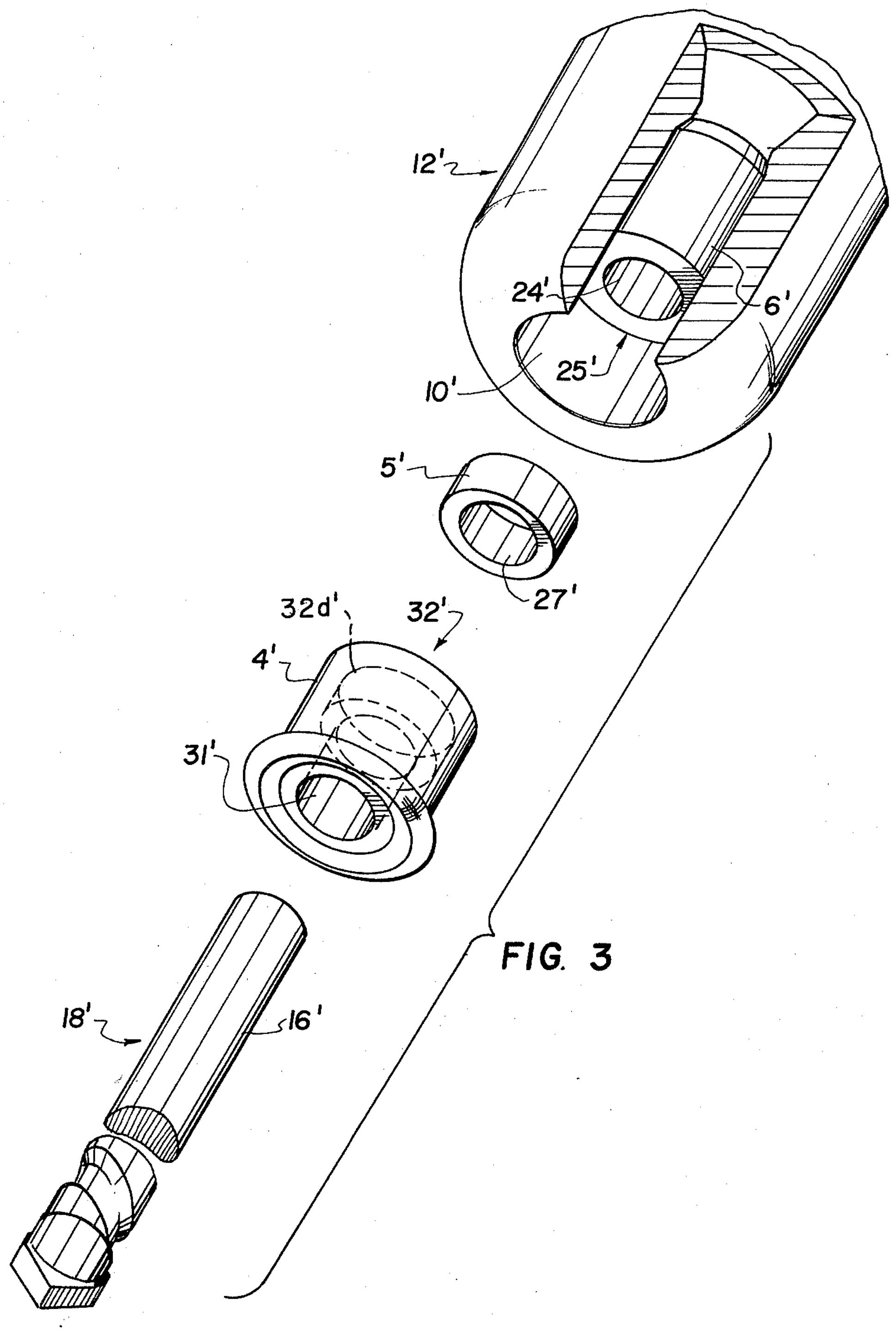
FIG. 3 is a front perspective exploded view of an alternate embodiment of the invention.

Referring now to FIG. 3, an embodiment of the invention is shown for receiving a circular cross-sectioned tool shank 16′. In this Figure, similar elements are designated with similar numbers having a prime. The pneumatic hammer 12′ of FIG. 3 may be of the rotary hammer type which permits a rotation of the shank 16′.

Since such a rotation is necessary or at least permissible, the mating surfaces 25′ and 32′ of the bushing 6′ and retainer 4′, respectively, are here shown as being planar and parallel for permitting a mutual rotation between these two elements. Retainer 4′ may be provided with an indentation 32*d*′ for receiving the seal ring 5′.

An alternate embodiment of the invention is shown in FIG. 4. A seal ring or member 45 is shown with its throughbore 46. An aperture 47 is also provided which is of arcuate or cylindrical shape. The seal retainer 40 of FIG. 4 is shown with a recess 41 for accepting the seal member 45. A pin 42 extends from the recess 41 and is provided to extend through aperture 47 for rotationally aligning the bore 46 of seal member 45 with the bore 43 of retainer member 40. A slight relative rotation may be provided when aperture 47 is slightly arcuate to permit an easy alignment of the bores 46, 43 and an easy insertion of the tool shank therethrough without undue damage and wear on the closely fitting bore 46 of the seal ring 45. An O-ring 44 may also be provided in an annular groove 48 on the body of retainer 40 for improving the fit between the retainer 40 and the nozzle hole of the pneumatic hammer. This O-ring also reduces the passage of any leaked air or pneumatic fluid which might escape between the housing and retainer member 40.

While specific embodiments of the invention have been shown and described in detail to illustrate the application of the principles of the invention, it will be understood that the invention may be embodied otherwise without departing from such principles.

What is claimed is:

1. A nozzle seal for restricting pneumatic leakage from a nozzle hole of a pneumatic hammer having a tool shank movable therein, comprising, a bushing member having a first bore therethrough adapted to be press-fit into the nozzle hole, the bushing member having a first mating surface adjacent one end of said first bore; a retainer member having a second bore therethrough aligned with said first bore and adapted to be slip-fit into the nozzle hole, the retainer member having a second mating surface mating with said first mating surface and a recess adjacent said second mating surface; and a seal member having a third bore therethrough aligned with said first and second bores and disposed in said recess of said retaining member, said third bore being of a size to closely receive the tool shank; said first, second and third bores being polygonal in cross-section to receive a tool shank having a corresponding polygonal cross-section.

2. A nozzle seal, as claimed in claim 1, wherein said retainer member includes a flange portion of a diameter larger than that of the nozzle hole.

3. A nozzle seal for restricting pneumatic leakage from a nozzle hole of a pneumatic hammer having a tool shank movable therein, comprising, a bushing member having a first bore therethrough adapted to be press-fit into the nozzle hole, the bushing member having a first mating surface adjacent one end of said first bore; a retainer member having a second bore therethrough aligned with said first bore and adapted to be slip-fit into the nozzle hole, the retainer member having a second mating surface mating with said first mating surface and a recess adjacent said second mating surface; and a seal member having a third bore therethrough aligned with said first and second bores and disposed in said recess of said retaining member, said third bore being of a size to closely receive the tool shank; said first and second mating surfaces each including a transverse surface and a bevel surface for preventing relative rotation between said bushing member and said retainer member within the nozzle hole.

4. A nozzle seal, as claimed in claim 3, wherein each of said mating surfaces include two parallel transverse surfaces connected by two bevel surfaces, said transverse and bevel surfaces of said bushing member mating with corresponding transverse and bevel surfaces of said retainer member.

5. A nozzle seal for restricting pneumatic leakage from a nozzle hole of a pneumatic hammer having a tool shank movable therein, comprising, a bushing member having a first bore therethrough adapted to be press-fit into the nozzle hole, the bushing member having a first mating surface adjacent one end of said first bore; a retainer member having a second bore therethrough aligned with said first bore and adapted to be slip-fit into the nozzle hole, the retainer member having a second mating surface mating with said first mating surface and a recess adjacent said second mating surface; and a seal member having a third bore therethrough aligned with said first and second bores and disposed in said recess of said retaining member, said third bore being of a size to closely receive the tool shank; said retainer member including a pin extending from said recess, said seal member including an aperture for receiving said pin to rotationally align said second bore of said retainer member with said third bore of said seal member.

6. In a pneumatic hammer, having a nozzle hole with a tool shank movable therein, the improvement comprising, a bushing/retainer member having a bore therethrough for movably receiving the tool shank, which bushing/retaining member being fixedly mounted within the nozzle hole, said bushing/retainer member having a recess therein, and a seal member disposed in the nozzle hole in said bushing/retainer member recess, said seal member having a bore therethrough for receiving and closely fitting around the tool shank, said recess being of a size at least slightly larger than said seal member, whereby pressurized pneumatic fluid produced by the pneumatic hammer is substantially restricted from leaking out through the nozzle hole.

7. In a pneumatic hammer, the improvement claimed in claim 6, wherein the pneumatic hammer comprises a jack hammer having means for axial reciprocal and non-rotary motion of the tool shank, and means associated with said bushing member for preventing a relative rotation therebetween.

8. In a pneumatic hammer, the improvement claimed in claim 7, further including means connected between said retainer member and said seal member for preventing a relative rotation therebetween.

9. In a pneumatic hammer, the improvement claimed in claim 6, wherein the pneumatic hammer comprises a rotary hammer having means for axial reciprocal and rotary motion of the tool shank.

10. In a pneumatic hammer, the improvement claimed in claim 6, wherein said bushing/retainer member comprises a bushing member having a bore therethrough for movably receiving the tool shank, said bushing member fixedly mounted within the nozzle hole, and a retainer member mounted within the nozzle hole adjacent said bushing member having a bore therethrough axially aligned with the bore of said bushing member for movably receiving a tool shank, at least one of said bushing member and retaining member having said recess therein facing the other of said bushing and retaining member.

11. In a pneumatic hammer, the improvement claimed in claim 10, wherein the tool shank and the bores extending through said bushing member, said retaining member and said seal member are circular.

12. In a pneumatic hammer, the improvement claimed in claim 10, wherein the cross-sectional shape of the tool shank and said bores through said bushing member, said retaining member and said seal member are polygonal.

13. In a pneumatic hammer, the improvement claimed in claim 10, wherein said seal member includes an arcuate aperture therein, and a pin engaged in said arcuate aperture connected to one of said bushing member and said retaining member.

14. In a pneumatic hammer, the improvement claimed in claim 10, wherein said bushing member and said retaining member have mating surfaces facing each other, each mating surface including a transverse surface and a bevel surface for preventing relative rotation between said bushing member and said retaining member.

* * * * *